United States Patent
Prasad et al.

(10) Patent No.: US 11,001,747 B2
(45) Date of Patent: May 11, 2021

(54) ALKANOLAMINE AND GLYCOL ETHER COMPOSITION FOR ENHANCED EXTRACTION OF BITUMEN

(71) Applicant: Dow Global Technologies LLC, Midland, MI (US)

(72) Inventors: Vikram Prasad, Midland, MI (US); Carol Lyons Bell, Freeland, MI (US); Biplab Mukherjee, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/651,604

(22) PCT Filed: Oct. 4, 2018

(86) PCT No.: PCT/US2018/054281
§ 371 (c)(1),
(2) Date: Mar. 27, 2020

(87) PCT Pub. No.: WO2019/070926
PCT Pub. Date: Apr. 11, 2019

(65) Prior Publication Data
US 2020/0299567 A1    Sep. 24, 2020

Related U.S. Application Data

(60) Provisional application No. 62/568,819, filed on Oct. 6, 2017.

(51) Int. Cl.
*C09K 8/592* (2006.01)
*C10G 1/04* (2006.01)
*E21B 43/24* (2006.01)

(52) U.S. Cl.
CPC .............. *C09K 8/592* (2013.01); *C10G 1/045* (2013.01); *C10G 1/047* (2013.01); *E21B 43/2408* (2013.01)

(58) Field of Classification Search
None
See application file for complete search history.

(56) References Cited

U.S. PATENT DOCUMENTS

| | | |
|---|---|---|
| 3,410,344 A | 11/1968 | Cornelius |
| 3,454,095 A | 7/1969 | Messenger et al. |
| 3,500,920 A | 3/1970 | Raifsnider |
| 3,692,125 A | 9/1972 | Ruhle |
| 3,782,472 A | 1/1974 | Siess, Jr. |
| 3,890,239 A | 6/1975 | Dycus et al. |
| 3,902,557 A | 9/1975 | Shaughnessy et al. |
| 3,993,133 A | 11/1976 | Clampitt |
| 3,994,345 A | 11/1976 | Needham |
| 4,175,618 A | 11/1979 | Wu et al. |
| 4,212,353 A | 7/1980 | Hall |
| 4,216,828 A | 8/1980 | Blair, Jr. |
| 4,405,825 A * | 9/1983 | Fenton ..................... C09K 3/00 137/13 |
| 4,522,732 A | 6/1985 | Purcell et al. |
| 4,814,094 A | 3/1989 | Blair, Jr. et al. |
| 4,968,412 A | 11/1990 | Guymon |
| 5,092,405 A | 3/1992 | Prukop |
| 5,110,487 A | 5/1992 | Current |
| 5,169,518 A * | 12/1992 | Klimpel ................ C10G 1/045 208/390 |
| 6,305,472 B2 | 10/2001 | Richardson et al. |
| 7,770,643 B2 | 8/2010 | Daussin |
| 2006/0276345 A1 | 12/2006 | Todd et al. |
| 2007/0284110 A1 | 12/2007 | Harris et al. |
| 2008/0139418 A1 | 6/2008 | Cioletti et al. |
| 2009/0078414 A1 | 3/2009 | Horvath Szabo et al. |
| 2012/0103635 A1 | 5/2012 | Sanders et al. |
| 2013/0081808 A1 | 4/2013 | Zeidani et al. |
| 2017/0241250 A1 | 8/2017 | Singh et al. |

FOREIGN PATENT DOCUMENTS

| WO | 2017222929 A1 | 12/2017 |
|---|---|---|
| WO | 2018111342 A1 | 6/2018 |

OTHER PUBLICATIONS

PCT/US2018/054281, International Search Report and Written Opinion with dated Dec. 17, 2018.
PCT/US2018/054281, International Preliminary Report on Patentability with dated Apr. 16, 2020.

* cited by examiner

*Primary Examiner* — Tam M Nguyen

(57) ABSTRACT

Embodiments relates to a bitumen recovery process from oil sands. The oil sands may be surface mined and transported to a treatment area or may be treated directly by means of an in situ process of oil sand deposits that are located too deep for strip mining. Specifically, the present invention involves the step of treating oil sands with a composition comprising an alkanolamine and an ethylene oxide capped glycol ether.

9 Claims, 2 Drawing Sheets

ALKANOLAMINE AND GLYCOL ETHER COMPOSITION FOR ENHANCED EXTRACTION OF BITUMEN

FIELD

Embodiments related to the recovery of bitumen from oil sands. More particularly, an improved method for bitumen recovery from oil sands through either surface mining or in situ recovery. The improvement is the use of a composition including an alkanolamine and an ethylene oxide capped glycol ether as an extraction aid in the water and/or steam used in the bitumen recovery process.

BACKGROUND

Deposits of oil sands are found around the world, but most prominently in Canada, Venezuela, and the United States. These oil sands contain significant deposits of heavy oil, typically referred to as bitumen. The bitumen from these oil sands may be extracted and refined into synthetic oil or directly into petroleum products. The difficulty with bitumen lies in that it typically is very viscous, sometimes to the point of being more solid than liquid. Thus, bitumen typically does not have the flowability of as less viscous, or lighter, crude oils.

Because of the viscous nature of bitumen, it cannot be produced from a well drilled into the oil sands as is the case with lighter crude oil. This is so because the bitumen simply does not flow without being first heated, diluted, and/or upgraded. Since normal oil drilling practices are inadequate to produce bitumen, several methods have been developed over several decades to extract and process oil sands to remove the bitumen. For shallow deposits of oil sands, a typical method includes surface extraction, or mining, followed by subsequent treatment of the oil sands to remove the bitumen.

The development of surface extraction (surface mining) processes has occurred most extensively in the Athabasca field of Canada. In these surface mining processes, the oil sands are mined, e.g., through strip or open pit mining with draglines, bucket-wheel excavators, and, more recently, shovel and truck operations. The oil sands are then transported to a facility to process and remove the bitumen from the sands. These processes typically involve a solvent of some type, most often water or steam, although other solvents, such as hydrocarbon solvents, have been used.

After excavation, a hot water extraction process is typically used in the Athabasca field in which the oil sands are mixed with water at temperatures ranging from approximately 35° C. to 75° C., with recent improvements lowering the temperature necessary to the lower portion of the range. An extraction agent, such as sodium hydroxide (NaOH), surfactants, and/or air may be mixed with the oil sands.

Water is added to the oil sands to create an oil sands slurry, to which additives such as NaOH may be added, which is then transported to an extraction plant, typically via a pipeline. Inside a separation vessel, the slurry is agitated and the water and NaOH releases the bitumen from the oil sands. Air entrained with the water and NaOH attaches to the bitumen, allowing it to float to the top of the slurry mixture and create a froth. The bitumen froth is further treated to remove residual water and fines, which are typically small sand and clay particles. The bitumen is then either stored for further treatment or immediately treated, either chemically or mixed with lighter petroleum products, and transported by pipeline for upgrading into synthetic crude oil. Unfortunately, this method cannot be used for deeper tar sand layers.

In situ techniques, e.g., that utilize steam, may be used to recover bitumen from deeper oil in well production. It is estimated that around 80 percent of the Alberta tar sands and almost all of the Venezuelan tar sands are too far below the surface to use open pit mining.

The above methods have many costs, environmental and safety problems associated with them. For example, the use of large amounts of steam is energy intensive and requires the processing and disposal of large amounts of water. Currently, tar sands extraction and processing requires several barrels of water for each barrel of oil produced. Strip mining and further treatment results in incompletely cleaned sand, which requires further processing, before it can be returned to the environment. Further, the use of a large quantity of caustic in surface mining not only presents process safety hazards but also contributes formation of fine clay particles in tailings, the disposal of which is a major environmental problem. Thus, there remains a need for efficient, safe and cost-effective methods to improve the recovery of bitumen from oil sands.

SUMMARY

Embodiments related to a bitumen recovery process comprising treating oil sands with a composition comprising, consisting essentially of, or consisting of (i) an alkanolamine and (ii) a glycol ether wherein the treatment is to oil sands recovered by surface mining or in situ production to oil sands in a subterranean reservoir.

In one embodiment of the bitumen recovery process described herein above, the alkanolamine (i) of the present invention is represented by the following formula:

$$HO-R-NH_2 \qquad\qquad I$$

where R is a linear alkyl group of 4 to 8 carbons, 5 to 8 carbons, and/or 6 carbons, with the proviso that the —$NH_2$ group and/or —OH group may independently be attached to a primary or a secondary carbon. Preferably the alkanolamine is hexanolamine, 6-amino-1-hexanol, 8-amino-1-octanol, or mixtures thereof. The alkanolamine may be present in the composition in an amount of 10 to 90 weight percent based on the total weight of the alkanolamine/ethylene oxide capped glycol ether composition.

And, the glycol ether is an ethylene oxide capped glycol ether (ii) represented by the following formula:

$$R_1-(C_2H_4O)_nH \qquad\qquad II$$

wherein $R_1$ is a linear, branched, cyclic alkyl, phenyl, or alkyl phenyl group of equal to or greater than 4 carbons, preferably n-butyl, n-pentyl, 2-methyl-1-pentyl, n-hexyl, n-heptyl, n-octyl, 2-ethylhexyl, 2-propylheptyl, phenyl, or cyclohexyl, and n is 1 to 3, 1, or 2. For example, the ethylene oxide capped glycol ethers is the ethylene oxide capped n-butyl ether, the ethylene oxide capped n-pentyl ether, the ethylene oxide capped n-hexyl ether, the ethylene oxide capped n-heptyl ether, the ethylene oxide capped n-octyl ether, the ethylene oxide capped phenyl ether, the ethylene oxide capped cyclohexyl ether, or mixtures thereof. The ethylene oxide capped glycol ether may be present in the composition in an amount of 90 to 10 weight percent based on the total weight of the alkanolamine/ethylene oxide capped glycol ether composition.

In one embodiment of the bitumen recovery process described herein above, the weight ratio of the alkanolamine to glycol ether may be 50:50.

In another embodiment, the bitumen recovery process by surface mining described herein above comprises the steps of: i) surface mining oil sands, ii) preparing an aqueous slurry of the oil sands, iii) treating the aqueous slurry with the alkanolamine and ethylene oxide capped glycol ether, iv) agitating the treated aqueous slurry, v) transferring the agitated treated aqueous slurry to a separation tank, and vi) separating the bitumen from the aqueous portion, preferably the ethylene oxide capped glycol ether is present in the aqueous slurry in an amount of from 0.01 to 10 weight percent based on the weight of the oil sands.

In another embodiment, the bitumen recovery process by in situ production described herein above comprises the steps of: i) treating a subterranean reservoir of oil sands by injecting steam containing the alkanolamine and ethylene oxide capped glycol ether and/or a propylene oxide capped glycol ether composition into a well, and ii) recovering the bitumen from the well, preferably the concentration of the ethylene oxide capped glycol ether in the steam is in an amount of from 0.01 to 10 weight percent.

DETAILED DESCRIPTION OF THE EMBODIMENTS

Figure 1:
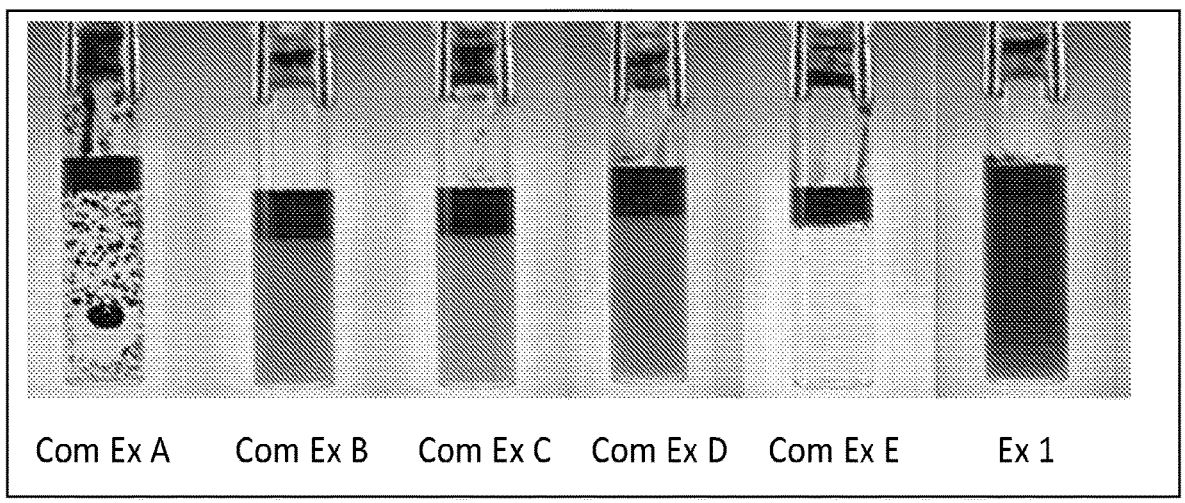
FIG. 1 is a photograph showing a diluted bitumen sample treated with an example of the invention and diluted bitumen samples treated with examples not of the present invention.

The terms "bitumen" and "heavy oil" are used interchangeably herewithin and the use of one term covers both. The bitumen recovery process may include accessing subterranean bitumen, extracting the bitumen from the subterranean sand and then recovering the bitumen from the subterranean location to above ground. For example, the oil sands may be recovered by surface or strip mining and transported to a treatment area. The separation of bitumen and/or heavy oil from oil sands may be accomplished by, but not limited to, two methods; surface mining and/or in situ recovery sometimes referred to as well production. In situ techniques may be used to recover deeper oil in well production. It is estimated that around 80 percent of the Alberta tar sands and almost all of the Venezuelan tar sands are too far below the surface to use open pit mining A good summary can be found in the article "Understanding Water-Based Bitumen Extraction from Athabasca Oil Sands", J. Masliyah, et al., *Canadian Journal of Chemical Engineering*, Volume 82, August 2004.

The basic steps in bitumen recovery via surface mining may include extraction, froth treatment, tailings treatment, and upgrading. The steps are interrelated; the mining operation affects the extraction and in turn the extraction affects the upgrading operation. The basic steps in the in situ treatment to recover bitumen from oil sands may include steam injection into a well, recovery of bitumen from the well, and dilution of the recovered bitumen, for example with condensate, for shipping by pipelines.

In well production, Cyclic Steam Stimulation (CSS) is an "huff and puff" in situ method, whereby steam is injected into the well at a temperature of from 250° C. to 400° C. The steam rises and heats the bitumen, decreasing its viscosity. The well is allowed to sit for days or weeks, and then hot oil mixed with condensed steam is pumped out for a period of weeks or months. The process is then repeated.

Steam Assisted Gravity Drainage (SAGD) is another in situ method where two horizontal wells are drilled in the tar sands, one at the bottom of the formation and another five meters above it. The wells are drilled in groups off of central pads. These wells may extend for miles in all directions. Steam is injected into the upper well, thereby melting the bitumen which then flows into the lower well. The resulting liquid oil mixed with condensed steam is subsequently pumped to the surface. Typical recovery of the available oil is 40 to 60 percent.

In commercial bitumen recovery operations, the oil sand may be mined in an open-pit mine using trucks and shovels. The mined oil sands are transported to a treatment area. The extraction step includes crushing the oil sand lumps and mixing them with (recycle process) water in mixing boxes, stirred tanks, cyclo-feeders or rotary breakers to form conditioned oil sands slurry. The conditioned oil sands slurry may be introduced to hydrotransport pipelines or to tumblers, where the oil sand lumps are sheared and size reduction takes place. Within the tumblers and/or the hydrotransport pipelines, bitumen may be recovered or "released', or "liberated", from the sand grains. Chemical additives can be added during the slurry preparation stage; for examples of such chemicals known in the art see, e.g., US2008/0139418, incorporated by reference herein in its entirety. In operations, the operating slurry temperature ranges may be from 35° C. to 75° C. and/or 40° C. to 55° C.

Entrained or introduced air attaches to bitumen in the tumblers and hydrotransport pipelines creating froth. In the froth treatment step, the aerated bitumen floats and is subsequently skimmed off from the slurry. This may be accomplished in large gravity separation vessels, normally referred to as primary separation vessels (PSV), separation cells (Sep Cell) or primary separation cells (PSC). Small amounts of bitumen droplets (usually un-aerated bitumen) remaining in the slurry may be further recovered using either induced air flotation in mechanical flotation cells and tailings oil recovery vessels, or cyclo-separators and hydrocyclones. The overall bitumen recovery in commercial operations may be from 88 to 95 percent of the original oil in place. The recovered bitumen in the form of froth may approximately contains 60 percent bitumen, 30 percent water and 10 percent solids.

The bitumen froth recovered as such may then be de-aerated, and diluted (mixed) with solvents to provide sufficient density difference between water and bitumen and to reduce the bitumen viscosity. The dilution by a solvent (e.g., naphtha or hexane) facilitates the removal of the solids and water from the bitumen froth using inclined plate settlers, cyclones and/or centrifuges. When a paraffinic diluent (solvent) is used at a sufficiently high diluent to bitumen ratio, partial precipitation of asphaltenes occurs. This may lead to the formation of composite aggregates that trap the water and solids in the diluted bitumen froth. In this way gravity separation is greatly enhanced, potentially eliminating the need for cyclones or centrifuges.

In the tailings treatment step, the tailings stream from the extraction plant goes to the tailings pond for solid-liquid separation. The clarified water may be recycled from the pond back to the extraction plant. To accelerate tailings handling, gypsum may be added to mature fine tailings to consolidate the fines together with the coarse sand into a non-segregating mixture. This method may be referred to as the consolidated (composite) tailing (CT) process. CT is disposed of in a geotechnical manner that enhances its further dewatering and eventual reclamation. Optionally, tailings from the extraction plant are cycloned, with the overflow (fine tailings) being pumped to thickeners and the cyclone underflow (coarse tailings) to the tailings pond. Fine tailings may be treated with flocculants, then thickened and pumped to a tailings pond. Further, the use of paste technology (addition of flocculants/polyelectrolytes) or a combination of CT and paste technology may be used for fast water release and recycle of the water in CT to the extraction plant for bitumen recovery from oil sands.

In the final step, the recovered bitumen may be upgraded. Upgrading either adds hydrogen or removes carbon in order to achieve a balanced, lighter hydrocarbon that is more valuable and easier to refine. The upgrading process may also remove contaminants such as heavy metals, salts, oxygen, nitrogen and sulfur. The upgrading process includes one or more steps such as the following: distillation wherein various compounds are separated by physical properties, coking, hydro-conversion, solvent deasphalting to improve the hydrogen to carbon ratio, and hydrotreating which removes contaminants such as sulfur.

In one embodiment, the improvement to the process of recovering bitumen from oil sands is contacting the oil sands containing the bitumen with a composition comprising, consisting essentially of, or consisting of (i) an alkanolamine and (ii) a glycol ether, preferably an ethylene oxide capped glycol ether. The composition that includes the alkanolamine and an ethylene oxide capped glycol ether base may be introduced as an additive to water and/or steam in a bitumen recovery process (via surface mining or in situ treatment). The mode of steam injection may include one or more of steam drive, steam soak, or cyclic steam injection in a single or multi-well program. Water flooding may be used in addition to one or more of the steam injection methods listed herein above.

Alkanolamines (i) of the present invention are represented by the following formula:

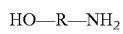

$$HO-R-NH_2 \quad \quad \text{I}$$

where R is a linear alkyl group of 4 to 8 carbons (e.g., 5 to 8 carbons and/or 6 carbons), with the proviso that the —NH$_2$ group and/or —OH group may independently be attached to a primary or a secondary carbon. Exemplary alkanolamine include 6-amino-1-hexanol, 8-amino-1-octanol, and mixtures thereof.

The alkanolamine (i) may be present in the composition (exclusive of any water and/or steam that the composition may be added to during a bitumen recover process) in an amount equal to or greater than 10 weight percent, equal to or greater than 20 weight percent, equal to or greater than 30 weight percent, equal to or greater than 40 weight percent, and/or equal to or greater than 50 weight percent based on the combined weights of the alkanolamine (i) and the glycol ether (ii).

The alkanolamine (i) may present in the composition (exclusive of any water and/or steam that the composition may be added to during a bitumen recover process) in an amount equal to or less than 90 weight percent, equal to or less than 80 weight percent, equal to or less than 70 weight percent, equal to or less than 60 weight percent, and/or equal to or less than 50 weight percent based on the combined weights of the alkanolamine (i) and the glycol ether (ii).

Ethylene oxide capped glycol ether (ii) of the present invention are represented by the following formula:

$$R_1-(C_2H_4O)_nH \quad \quad \text{II}$$

wherein R$_1$ is a linear, branched, cyclic alkyl, phenyl, or alkyl phenyl group of equal to or greater than 4 carbons, preferably n-butyl, n-pentyl, 2-methyl-1-pentyl, n-hexyl, n-heptyl, n-octyl, 2-ethylhexyl, 2-propylheptyl, phenyl, or cyclohexyl, and n is 1 to 3, 1 to 2, 1, or 2.

As used hereafter, ethylene oxide capped glycol ethers means that the ethylene oxide cap comprises 1 to 3 ethylene oxide units. Exemplary ethylene oxide capped glycol ethers are the ethylene oxide capped n-butyl ether, the ethylene oxide capped n-pentyl ether, the ethylene oxide capped n-hexyl ether, the ethylene oxide capped n-heptyl ether, the ethylene oxide capped n-octyl ether, the ethylene oxide capped phenyl ether, the ethylene oxide capped cyclohexyl ether, and mixtures thereof.

The glycol ether (ii) may be present in the composition (exclusive of any water and/or steam that the composition may be added to during a bitumen recover process) in an amount equal to or less than 90 weight percent, equal to or less than 80 weight percent, equal to or less than 70 weight percent, equal to or less than 60 weight percent, and/or equal to or less than 50 weight percent based on the combined weights of the alkanolamine (i) and glycol ether (ii).

The glycol ether (ii) may be present in the composition (exclusive of any water and/or steam that the composition may be added to during a bitumen recover process) in an amount equal to or greater than 10 weight percent, equal to or greater than 20 weight percent, equal to or greater than 30 weight percent, equal to or greater than 40 weight percent, and/or equal to or greater than 50 weight percent based on the combined weights of the alkanolamine (i) and glycol ether (ii).

The composition may include, consist of, and/or consistent essentially of the alkanolamines (i) and ethylene oxide capped glycol ether (ii). A weight ratio of the alkanolamines (i) and ethylene oxide capped glycol ether (ii) in the composition may be from 10:90 to 90:10, from 20:80 to 80:20, from 30:70 to 70:30, from 40:60 to 60:40, from 45:55 to 55:45, etc. In an exemplary embodiment, a weight ratio of the alkanolamine (i) to ethylene oxide capped glycol ether (ii) in the composition is 50:50. The composition may be mixed with at least one selected from water and steam, e.g., to form a solution. The solution may be mixed with oil sands to form an aqueous slurry.

A weight percent of the composition in the at least one selected from water and steam may be equal to or greater than 0.01 weight percent, equal to or greater than 0.1 weight percent, equal to or greater than 0.4 weight percent, equal to or greater than 0.5 weight percent, equal to or greater than 0.6 weight percent, equal to or greater than 0.8 weight percent, equal to or greater than 0.9 weight percent, and/or equal to or greater than 1.0 weight percent, based on a total weight of the composition and the water and/or steam (exclusive of the weight of oil sands). A weight percent of the composition in the at least one selected from water and steam may be equal to or less than 40 weight percent, equal to or less than 30 weight percent, equal to or less than 20 weight percent, equal to or less than 10 weight percent, equal to or less than 5 weight percent, equal to or less than 3 weight percent, equal to or less than 2 weight percent, equal to or less than 1.5 weight percent, and/or equal to or less than 1 weight percent, based on a total weight of the composition and the water and/or steam (exclusive of the weight of oil sands).

In exemplary embodiments, the alkanolamine/ethylene oxide capped glycol ether composition may be added to the oil sands slurry neat or as an aqueous solution having a concentration of from 0.01 to 10 weight percent ethylene oxide capped glycol ether based on the total weight of the alkanolamine/ethylene oxide capped glycol ether composition solution (inclusive of the at least one selected from water and/or steam). For example, in surface mining the ethylene oxide capped glycol ether may be present in an aqueous oil sands slurry in an amount of from 0.01 to 10 weight percent (e.g., from 0.1 to 5 weight percent, from 0.1 to 3 weight percent, from 0.1 to 2 weight percent, from 0.1 to 1 weight percent, and/or from 0.3 to 0.6 weight percent) based on the weight of the oil sands.

In an exemplary embodiment, the alkanolamine/ethylene oxide capped glycol ether solution/oil sand slurry (e.g., obtained from surface mining) may be agitated from 5 minutes to 4 hours and/or for an hour or less. The alkanolamine/ethylene oxide capped glycol ether solution oil sands slurry may be heated to equal to or greater than 35° C., equal to or greater than 40° C., equal to or greater than 55° C., and/or equal to or greater than 60° C. For example, the alkanolamine/ethylene oxide capped glycol ether solution oil sands slurry may be heated to equal to or less than 100° C., equal to or less than 80° C., and/or equal to or less than 75° C.

As outlined herein above, the alkanolamine/ethylene oxide capped glycol ether treated slurry may be transferred to a separation tank, typically comprising a diluted detergent solution, wherein the bitumen and heavy oils are separated from the aqueous portion. The solids and the aqueous portion may be further treated to remove any additional free organic matter.

In another exemplary embodiment, bitumen is recovered from oil sands through well production wherein the alkanolamine/ethylene oxide capped glycol ether composition as described herein above can be added to oil sands by means of in situ treatment of the oil sand deposits that are located too deep for strip mining. The two most common methods of in situ production recovery are cyclic steam stimulation (CSS) and steam-assisted gravity drainage (SAGD). CSS can utilize both vertical and horizontal wells that alternately inject steam and pump heated bitumen to the surface, forming a cycle of injection, heating, flow and extraction. SAGD utilizes pairs of horizontal wells placed one over the other within the bitumen pay zone. The upper well may be used to inject steam, creating a permanent heated chamber within which the heated bitumen flows by gravity to the lower well, which extracts the bitumen. However, new technologies, such as vapor recovery extraction (VAPEX) and cold heavy oil production with sand (CHOPS) are being developed.

An improvement to the process of recovering bitumen from oil sands is the addition of the alkanolamine/ethylene oxide capped glycol ether composition during the slurry preparation stage. The sized material may be added to a slurry tank with agitation and combined with the alkanolamine/ethylene oxide capped glycol ether composition.

The basic steps in the in situ treatment to recover bitumen from oil sands includes: steam injection into a well, recovery of bitumen from the well, and dilution of the recovered bitumen, for example with condensate, for shipping by pipelines.

In accordance with this method, the alkanolamine/ethylene oxide capped glycol ether composition is used as a steam additive in a bitumen recovery process from a subterranean oil sand reservoir. The mode of steam injection may include one or more of steam drive, steam soak, or cyclic steam injection in a single or multi-well program. Water flooding may be used in addition to one or more of the steam injection methods listed herein above.

The steam may be injected into an oil sands reservoir through an injection well, and wherein formation fluids, comprising reservoir and injection fluids, are produced either through an adjacent production well or by back flowing into the injection well.

In oil sand reservoirs, a steam temperature of at least 180° C., which corresponds to a pressure of 150 psi (1.0 MPa), or greater may be needed to mobilize the bitumen. Accordingly, the alkanolamine/ethylene oxide capped glycol ether composition-steam injection stream may be introduced to the reservoir at a temperature in the range of from 150° C. to 300° C. and/or 180° C. to 260° C. The particular steam temperature and pressure used in the process of the present invention will depend on such specific reservoir characteristics as depth, overburden pressure, pay zone thickness, and bitumen viscosity, and thus will be worked out for each reservoir.

It may be preferable to inject the alkanolamine/ethylene oxide capped glycol ether composition simultaneously with the steam in order to ensure or maximize the amount of ethylene oxide capped glycol ether actually moving with the steam. In some instances, it may be desirable to precede or follow a steam-alkanolamine/ethylene oxide capped glycol ether composition injection stream with a steam-only injection stream. In this case, the steam temperature can be raised above 260° C. during the steam-only injection. The term "steam" used herein is meant to include superheated steam, saturated steam, and less than 100 percent quality steam.

For purposes of clarity, the term "less than 100 percent quality steam" refers to steam having a liquid water phase present. Steam quality is defined as the weight percent of dry steam contained in a unit weight of a steam-liquid mixture. "Saturated steam" is used synonymously with "100 percent quality steam". "Superheated steam" is steam which has been heated above the vapor-liquid equilibrium point. If super-heated steam is used, the steam is preferably superheated to between 5 to 50° C. above the vapor-liquid equilibrium temperature, prior to adding the alkanolamine/ethylene oxide capped glycol ether composition.

The alkanolamine/ethylene oxide capped glycol ether composition may be added to the steam neat or as a concentrate. If added as a concentrate, it may be added as a 1 to 99 weight percent solution in water. Preferably, the alkanolamine/ethylene oxide capped glycol ether composition is substantially volatilized and carried into the reservoir as an aerosol or mist. Here again, the rationale is to maximize the amount of alkanolamine and/or ethylene oxide capped glycol ether traveling with the steam into the reservoir.

The alkanolamine/ethylene oxide capped glycol ether composition is preferably injected intermittently or continuously with the steam, so that the steam-alkanolamine/ethylene oxide capped glycol ether composition injection stream reaches the downhole formation through common tubing. The rate of alkanolamine/ethylene oxide capped glycol ether composition addition is adjusted so as to maintain the preferred ethylene oxide capped glycol ether concentration of 0.01 to 10 weight percent in steam. The rate of steam injection for a typical oil sands reservoir might be on the order of enough steam to provide an advance through the formation of from 1 to 3 feet/day.

An effective SAGD additive must satisfy many requirements to be considered as successful. The major criteria of a successful additive is the ability of the additive to travel with steam and reach unrecovered in-situ bitumen in reservoir formation, favorably interact with water/bitumen/rock to enhance bitumen recovery, and not adversely interfere with existing operations. Among the three, the requirement of an additive to vaporize at SAGD operating temperatures and travel with steam limits the choice and consideration of different chemistries in SAGD technology. For example, many high molecular weight surfactants even though are known to help enhance oil recovery are not considered as SAGD additives due to their inability to travel with steam owing to high boiling point. However, many ethylene oxide capped glycol ethers and/or propylene oxide capped glycol ethers which have high boiling point than water are an exception to this. Phase equilibrium studies have shown favorable partitioning of this class of materials in vapor (i.e., steam) compared to that in liquid (i.e., water) phase. The unique ability to partition more in vapor arises from the ability of many ethylene oxide capped glycol ethers and/or propylene oxide capped glycol ethers to form water-additive azeotrope especially when present at low concentration and thereby many including those mentioned in this embodiment can travel with steam.

In the recovery of bitumen process, a treatment (of contacting the oil sands with the composition that includes the alkanolamine (i) and the ethylene oxide capped glycol ether (ii)) may performed before or concurrent with mixing the composition with the at least one selected from water and/or steam. Further, the recovery of the bitumen may be performing after the treatment.

In an exemplary embodiment, a process for the recovery of bitumen may include: (a) injecting a steam and/or water solution into a subterranean location containing bitumen, the steam and/or water solution including the an alkanolamine (i) and the ethylene oxide capped glycol ether (ii); and (b) recovering at least a portion of the bitumen from the subterranean location to above ground. In another exemplary embodiment, a process for the recovery of bitumen may include: (a) surface mining oil sands, (b) above ground preparing a steam and/or water solution including the an alkanolamine (i) and the ethylene oxide capped glycol ether (ii); (c) treating the mined oil sands with the steam and/or water solution including the an alkanolamine (i) and the ethylene oxide capped glycol ether (ii); and (d) recovering at least a portion of the bitumen.

EXAMPLES

A diluted bitumen sample ('dilbit') is prepared by adding together bitumen, dodecane and toluene in a 75/12.5/12.5 mixture (by weight).

Comparative Example A is a 1 wt % solution in deionized water of diethylene glycol mobohexyl ether (a glycol ether having the structure II where $R_1$ is hexyl and n is 2) available as Hexyl CARBITOL™ from The Dow Chemical Company.

Comparative Example B is a 1 wt % solution in deionized water of hexanolamine (an alkanolamine having the structure I where R is hexyl) available as 6-amino-1-hexanol from Sigma Aldrich.

Comparative Example C is a 1 wt % solution in deionized water of propanolamine (an alkanolamine having the structure I where R is propyl) available as 3-amino-1-propanol from Sigma Aldrich.

Comparative Example D is a 0.5 wt % solution of the diethylene glycol monohexyl ether in Comparative Example A and 0.5 wt % of the propanolamine in Comparative Example C in deionized water.

Comparative Example E is deionized water.

Working Example 1 is a 0.5 wt % solution of the diethylene glycol monohexyl ether in Comparative Example A and 0.5 wt % of the hexanolamine in Comparative Example B in deionized water.

680 µL of each solution is placed in a 1 mL vial. Then 120 µL of dilbit is added on top of each solution. The vials are heated to 70° C. in a robotic imaging station and allowed to equilibrate for 20 minutes. A picture is taken, then the vials are shaken vigorously by the imaging robot for 15 seconds, and a second picture is taken one hour after shaking. The results are shown in FIG. 1. The intensities of the water subphases are then determined by subtracting the image background, cropping the image, thresholding the pixel intensity using Otsu thresholding, and computing the average intensity over the remaining pixels, pixyl intensity is reported as a value between 0 (clear) to 255 (opaque). Results for the comparative examples are shown in Table 1.

TABLE 1

|  | Com Ex | | | | | Working Ex |
|---|---|---|---|---|---|---|
|  | A | B | C | D | E | 1 |
| Intensity | 21.4 | 76.7 | 56.4 | 63.8 | 2.3 | 114 |

Referring to Table 1 and FIG. 1, it is seen that Working Example 1 provides significantly improved results with respect to Intensity.

Figure 2:
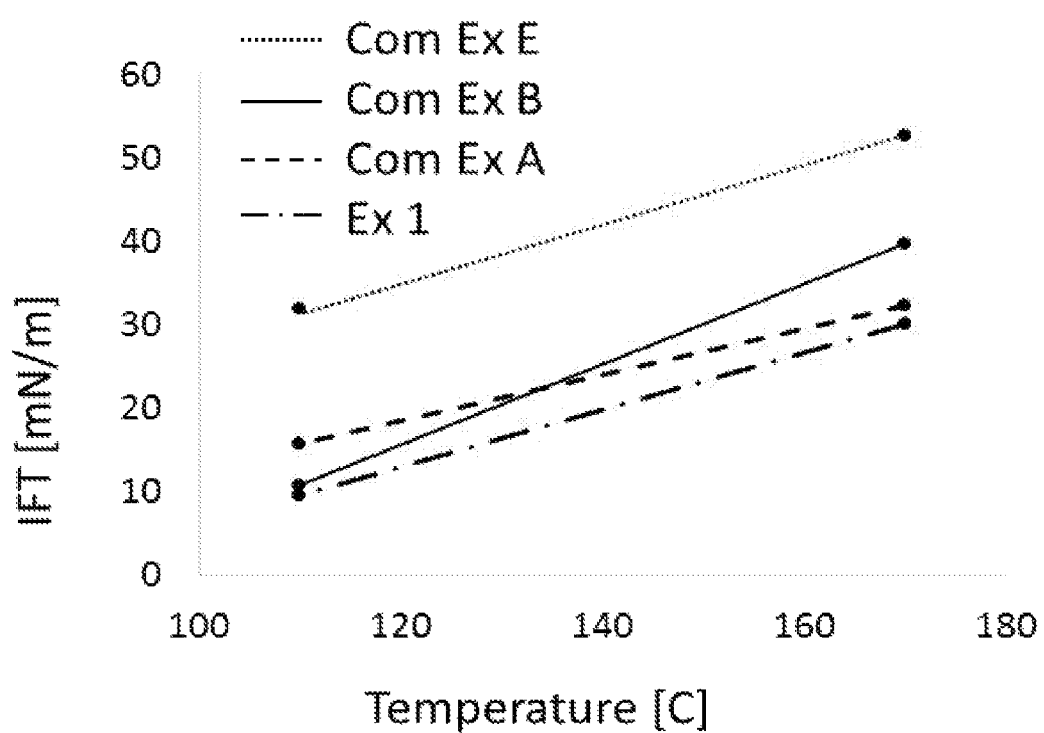
FIG. 2 is a plot of interfacial tension (IFT) at two temperatures for a diluted bitumen sample treated with an example of the invention and diluted bitumen samples treated with examples not of the present invention.

Interfacial tension (IFT) measurements are also performed using a high-temperature, high-pressure pendant drop tensiometer at two different temperatures (T=110° C. and 170° C.) for Comparative Examples A, B, and E and Example 1. The results are shown graphically in FIG. 2.

What is claimed is:

1. A method to recover bitumen, the method comprising:
performing a treatment by contacting oil sands with a composition including:
(i) an alkanolamine described by the following structure:

HO—R—NH$_2$ 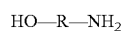

where R is a linear alkyl group of 4 to 8 carbons with the proviso that the —NH$_2$ group and/or —OH group are independently attached to a primary or a secondary carbon
and
(ii) an ethylene oxide capped glycol ether described by the following structure:

R$_1$—(C$_2$H$_4$O)$_n$H 

wherein R$_1$ is a linear, branched, cyclic alkyl, phenyl, or alkyl phenyl group of equal to or greater than 4 carbons and n is 1 to 3,
wherein the treatment recovers bitumen from oil sands recovered by surface mining or in situ production.

2. The method of claim 1, further comprising:
mixing the composition with at least one selected from water and steam; and
recovering the bitumen after performing the treatment.

3. The method of claim 1, wherein the treatment is to oil sands recovered by surface mining and the method further includes:
i) surface mining the oil sands,
ii) preparing an aqueous slurry of the oil sands that includes the composition to form a treated aqueous slurry, iii) agitating the treated aqueous slurry to form an agitated treated aqueous slurry, iv) transferring the agitated treated aqueous slurry to a separation tank, and v) separating bitumen from an aqueous portion in the separation tank.

4. The method of claim 3, wherein the ethylene oxide capped glycol ether is present in the aqueous slurry in an amount of from 0.01 to 10 weight percent based on the weight of the oil sands.

5. The method of claim 1, wherein the treatment is to oil sands recovered by in situ production and the method further includes:

i) injecting steam containing the composition into a well, and ii) recovering the bitumen from the well.

6. The method of claim 5, wherein the ethylene oxide capped glycol ether is present in the steam is in an amount of from 0.01 to 10 weight percent based on a total weight of the steam and the composition.

7. The method of claim 1, wherein a weight ratio of the alkanolamine to the ethylene oxide capped glycol ether in the composition is from 10:90 to 90:10.

8. The method of claim 1, wherein the alkanolamine is 6-amino-1-hexanol, 8-amino-1-octanol, or mixtures thereof.

9. The method of claim 1, wherein the ethylene oxide capped glycol ether is ethylene oxide capped n-butyl ether, ethylene oxide capped n-hexyl ether, or mixtures thereof.

* * * * *